(12) United States Patent
Mikayama et al.

(10) Patent No.: US 9,447,218 B2
(45) Date of Patent: Sep. 20, 2016

(54) BINDER FOR MANUFACTURING INORGANIC SINTERED BODY

(71) Applicant: SEKISUI CHEMICAL CO., LTD., Osaka (JP)

(72) Inventors: Kaoru Mikayama, Osaka (JP); Yasuharu Nagai, Osaka (JP); Yuki Ishikawa, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 14/781,061

(22) PCT Filed: Jan. 9, 2014

(86) PCT No.: PCT/JP2014/050223
§ 371 (c)(1),
(2) Date: Sep. 29, 2015

(87) PCT Pub. No.: WO2014/156214
PCT Pub. Date: Oct. 2, 2014

(65) Prior Publication Data
US 2016/0053039 A1 Feb. 25, 2016

(30) Foreign Application Priority Data

Mar. 29, 2013 (JP) .................. 2013-074353

(51) Int. Cl.
| | | |
|---|---|---|
| C08F 261/08 | (2006.01) | |
| C08F 261/12 | (2006.01) | |
| H01G 4/12 | (2006.01) | |
| B32B 18/00 | (2006.01) | |
| C04B 35/468 | (2006.01) | |
| C04B 35/634 | (2006.01) | |
| C04B 35/645 | (2006.01) | |

(52) U.S. Cl.
CPC ............ *C08F 261/08* (2013.01); *B32B 18/00* (2013.01); *C04B 35/4682* (2013.01); *C04B 35/634* (2013.01); *C04B 35/645* (2013.01); *C08F 261/12* (2013.01); *H01G 4/12* (2013.01); *C04B 2235/5445* (2013.01); *C04B 2237/346* (2013.01)

(58) Field of Classification Search
CPC .... C08F 261/08; C08F 261/12; B32B 18/00; C04B 35/4682; C04B 35/645; C04B 2235/5445; C04B 2237/346; H01G 4/12
See application file for complete search history.

(56) References Cited

U.S. PATENT DOCUMENTS

| | | | |
|---|---|---|---|
| 6,506,835 B1* | 1/2003 | Hofmann | B32B 17/10761 524/502 |
| 9,249,292 B2* | 2/2016 | Hamakura et al. | C08G 2/00 |
| 2004/0212123 A1* | 10/2004 | Koizumi et al. | B01J 20/26 264/122 |
| 2004/0260020 A1 | 12/2004 | Miyake et al. | |
| 2007/0007700 A1 | 1/2007 | Satou et al. | |
| 2011/0049434 A1 | 3/2011 | Ootsuki et al. | |

FOREIGN PATENT DOCUMENTS

| | | |
|---|---|---|
| CN | 1300090 | 6/2001 |
| CN | 1555590 | 12/2004 |
| CN | 1860004 | 11/2006 |
| CN | 101047064 | 10/2007 |
| JP | 5-194019 | 8/1993 |
| JP | 6-237054 | 8/1994 |
| JP | 9-169569 | 6/1997 |
| JP | 2001-172553 | 6/2001 |
| JP | 2004-331413 | 11/2004 |
| JP | 3739237 | 1/2006 |
| JP | 2008-297348 | 12/2008 |
| JP | 2013-100389 | 5/2013 |
| JP | 2013-121906 | 6/2013 |
| KR | 10-2011-0087209 | 8/2011 |

OTHER PUBLICATIONS

International Search Report issued Mar. 25, 2014 in International Application No. PCT/JP2014/050223.
Written Opinion of the International Searching Authority issued Mar. 25, 2014 in International Application No. PCT/JP2014/050223.

* cited by examiner

*Primary Examiner* — Nathan M Nutter
(74) *Attorney, Agent, or Firm* — Wenderoth, Lind & Ponack, LLP.

(57) ABSTRACT

The present invention provides a binder for manufacturing an inorganic sintered body that has excellent adhesiveness upon heat pressing and thermal decomposability and, especially when used as a binder for a ceramic green sheet, provides a ceramic green sheet having sufficient mechanical strength and flexibility. The present invention also provides a paste for manufacturing an inorganic sintered body, a ceramic green sheet, and a ceramic laminate individually manufactured using the binder for manufacturing an inorganic sintered body. The present invention provides a binder for manufacturing an inorganic sintered body containing a graft copolymer having a unit including polyvinyl butyral and a unit including a poly(meth)acrylic compound, the polyvinyl butyral having a polymerization degree of 800 to 5000, a hydroxy group content of 20 to 40 mol %, and a butyralization degree of 60 to 80 mol %, the unit including a poly(meth)acrylic compound having a glass transition temperature of 0 to 110° C.

17 Claims, No Drawings

BINDER FOR MANUFACTURING INORGANIC SINTERED BODY

TECHNICAL FIELD

The present invention relates to a binder for manufacturing an inorganic sintered body that has excellent adhesiveness upon heat pressing and thermal decomposability and, especially when used as a binder for a ceramic green sheet, provides a ceramic green sheet having sufficient mechanical strength and flexibility. The present invention also relates to a paste for manufacturing an inorganic sintered body, a ceramic green sheet, and a ceramic laminate individually manufactured using the binder for manufacturing an inorganic sintered body.

BACKGROUND ART

A widely employed method for manufacturing various inorganic sintered bodies includes the steps of mixing inorganic powder (e.g., alumina, silica, zirconia, mullite, silicon carbide, silicon nitride, and barium titanate) with a binder (e.g., various thermoplastic resins and organic compounds) to provide a green formed article, and firing the formed article to sinter the inorganic powder while decomposing and scattering the binder.

For example, for manufacturing a ceramic circuit board, a layered ceramic capacitor, or a separator for thin-layer chromatography, a ceramic green sheet formed in the shape of a thin film is used.

A ceramic green sheet is manufactured by uniformly mixing ceramic raw material powder, a binder resin, a plasticizer, a defoamer, a dispersant, an organic solvent, and the like using a mixer such as a ball mill to prepare slurry, applying the slurry to a support body, and removing the solvent by drying.

Especially, in the case of manufacturing a layered ceramic capacitor, the support body used is a PET film preliminary subjected to release treatment. After application of an electrically conductive paste that will serve as an internal electrode to a ceramic green sheet, the ceramic green sheet is peeled from the PET film as a support body. The resulting sheet is punched to give a piece in a predetermined size. A plurality of such pieces are stacked and heat-pressed to give a laminate, and then subjected to firing for removal of the binder resin by thermal decomposition. In this manner, a layered ceramic capacitor is manufactured.

Along with the recent trend toward miniaturization of electronic devices, a layered ceramic capacitor has been also desired to be miniaturized and to have a larger capacity. In a currently tried method for manufacturing a layered ceramic capacitor, ceramic powder having a smaller particle size (e.g., particle size of 500 nm or smaller) than conventional ceramic powder is used and 200 or more sheets of the resulting thin green sheets (e.g., 5 μm or less in thickness) are laminated.

A binder used in such a ceramic green sheet is desired to show higher performance than ever in the effect of increasing the strength of a ceramic green sheet to be manufactured and in thermal decomposability upon firing. Moreover, as described above, for lamination of 200 or more sheets of thin ceramic green sheets, favorable adhesiveness upon heat-pressing is important.

Patent Literature 1, for example, discloses a method of manufacturing a ceramic green sheet excellent in adhesiveness upon heat-pressing. The method uses polyvinyl acetal resins having different polymerization degrees in combination.

In a case where polyvinyl acetal is solely used as a binder resin, however, thermal decomposability is poor, though the sheet strength is good. Accordingly, the binder may not be completely decomposed and burned up and thus partly left as a residual carbide in the sintered body. Or, drastic decomposition and scattering of the binder in the sintering process may cause cracks, warping, swelling, or the like of a formed article.

The use of an acrylic resin, which has excellent thermal decomposability, is also considered. In this case, though the amount of a residual carbide after firing is reduced, a ceramic green sheet manufactured using an acrylic resin as a binder does not have sufficient strength or flexibility. As a result, in the process of drying the green sheet or in other subsequent processes, the green sheet unfortunately tends to have cracks.

To overcome the above problems, Patent Literature 2 discloses, as a binder that provides excellent sheet strength and flexibility, an acrylic binder having specifically defined resin characteristics (e.g., average molecular weight, acid value, glass transition temperature), for example. Patent Literature 3 and Patent Literature 4 individually disclose the use of an acrylic binder containing phthalate esters or the like as a plasticizer for the purpose of manufacturing a ceramic green sheet with flexibility.

Even in a case where the binder and the ceramic green sheet disclosed in the above literatures are used, when a thin ceramic green sheet having a thickness of 5 μm or less is to be manufactured, sufficient sheet strength or flexibility may not be achieved, problematically leading to damage of the ceramic green sheet upon peeling or punching.

CITATION LIST

Patent Literature

Patent Literature 1: Japanese Patent No. 3739237
Patent Literature 2: JP-A 06-237054
Patent Literature 3: JP-A 05-194019
Patent Literature 4: JP-A 09-169569

SUMMARY OF INVENTION

Technical Problem

The present invention aims to provide a binder for manufacturing an inorganic sintered body that has excellent adhesiveness upon heat pressing and thermal decomposability and, especially when used as a binder for a ceramic green sheet, provides a ceramic green sheet having sufficient mechanical strength and flexibility. The present invention also aims to provide a paste for manufacturing an inorganic sintered body, a ceramic green sheet, and a ceramic laminate individually manufactured using the binder for manufacturing an inorganic sintered body.

Solution to Problem

The present invention provides a binder for manufacturing an inorganic sintered body containing a graft copolymer, the graft copolymer having a unit including polyvinyl butyral and a unit including a poly(meth)acrylic compound, the polyvinyl butyral having a polymerization degree of 800 to 5000, a hydroxy group content of 20 to 40 mol %, and a butyralization degree of 60 to 80 mol %, the unit including a poly(meth)acrylic compound having a glass transition temperature of 0 to 110° C.

The present invention is specifically described in the following.

The present inventors found that the use of a graft copolymer of polyvinyl butyral and a poly(meth)acrylic compound each having a specific structure as a binder for forming an inorganic sintered body gives excellent adhesiveness upon heat pressing and thermal decomposability, and also found that especially the use of the graft copolymer as a binder for a ceramic green sheet enables manufacturing of a ceramic green sheet having sufficient mechanical strength and flexibility, thereby completing the present invention.

The binder for manufacturing an inorganic sintered body of the present invention contains a graft copolymer having a unit including polyvinyl butyral and a unit including a poly(meth)acrylic compound (hereafter, also simply referred to as a graft copolymer).

In the present invention, the "unit including polyvinyl butyral" and the "unit including a poly(meth)acrylic compound" refer to "polyvinyl butyral" and "a poly(meth) acrylic compound", respectively, present in the graft copolymer.

The graft copolymer having a unit including polyvinyl butyral and a unit including a poly(meth)acrylic compound refers to a branched copolymer in which one of a "unit including polyvinyl butyral" and a "unit including a poly (meth)acrylic compound" constituting the main chain is combined with the other unit of the "unit including polyvinyl butyral" and the "unit including poly(meth)acrylic compound" constituting a side chain.

Being a graft copolymer, the graft copolymer having a unit including polyvinyl butyral and a unit including a poly(meth)acrylic compound enables manufacturing of a green sheet having high sheet strength when used as a binder for a ceramic green sheet.

As the binder used is a graft copolymer, a moiety having a polyvinyl butyral structure and a moiety having a poly (meth)acrylic compound structure are present uniformly in the binder resin without macroscopic phase separation. As a result, the binder can exhibit its performance (e.g., flexibility, thermal decomposability) sufficiently.

Moreover, being a graft copolymer, the binder is less likely to cause an increase in the viscosity when converted into slurry, which advantageously avoids the use of an excessive amount of an organic solvent, ensures favorable workability upon preparation, and gives slurry for a ceramic green sheet having excellent coating properties.

Additionally, since two units having different moduli of elasticity are present in combination, the unit having a lower modulus of elasticity can release the stress. In a case of being used as a binder for a ceramic green sheet, such a graft copolymer can give sufficient flexibility.

Moreover, even if a stress acts on the ceramic green sheet upon punching or heat-pressing after lamination, the stress is effectively absorbed, thereby preventing formation of cracks in the sheet.

The structure of the graft copolymer having a unit including polyvinyl butyral and a unit including a poly(meth) acrylic compound is designed in accordance with the use thereof. Examples of the structure include a case where a unit including polyvinyl butyral forms a trunk and a unit including a poly(meth)acrylic compound forms a branch, a case where a unit including a poly(meth)acrylic compound forms a trunk and a unit including polyvinyl butyral forms a branch, a case where polymers having the former structure and polymers having the latter structure are both present, and a case where the above structures are both present in a single polymer.

The molecular weight of the graft copolymer is not particularly limited, and the number average molecular weight (Mn) is preferably 10000 to 400000, the weight average molecular weight (Mw) is preferably 20000 to 800000, and the ratio thereof (Mw/Mn) is preferably 2.0 to 40. In a case where the Mn, Mw, and Mw/Mn are within these ranges, the use of the graft copolymer as a binder for a ceramic green sheet can control the balance between the sheet strength and the flexibility. Moreover, such a graft copolymer is preferable because the slurry viscosity is prevented from being too high and the dispersibility of inorganic powder is favorable to enable manufacturing of a uniform ceramic green sheet.

The unit including polyvinyl butyral (hereafter, also referred to as a polyvinyl butyral unit) has a minimum polymerization degree of 800 and a maximum polymerization degree of 5000. If the polymerization degree of the polyvinyl butyral unit is less than 800, the resulting ceramic green sheet may have poor sheet strength, and are likely to suffer from cracks or damage. In contrast, if the polymerization degree is more than 5000, the resulting ceramic green sheet may have excessive hardness, leading to reduction not only in the flexibility but also in the adhesiveness. This may cause an adhesion defect such as interlayer peeling in the step of lamination by heat-pressing.

If such a polymer is converted into slurry, the slurry may have too high a viscosity to lower the dispersibility of ceramic powder. In addition, the slurry applied to a support body may form uneven coating, failing to provide a uniform ceramic green sheet. The lower limit of the polymerization degree is preferably 1000, and the upper limit thereof is preferably 4500.

The polyvinyl butyral unit has a vinyl acetate unit, a vinyl alcohol unit, and a vinyl butyral unit, which are commonly included in polyvinyl butyral.

In the polyvinyl butyral unit, the amount of the vinyl alcohol unit (hydroxy group content) is 20 mol % at the minimum and 40 mol % at the maximum. If the hydroxy group content is less than 20 mol %, the resulting green sheet has too strong flexibility, leading to poor peelability from the support body. Moreover, the resulting sheet may have poor strength, or the dispersibility of ceramic powder may be lowered. If the hydroxy group content is more than 40 mol %, the hardness increases due to hydrogen bonding. In such a case, the resulting ceramic green sheet cannot have sufficient flexibility. Moreover, such a polymer converted into slurry increases the viscosity to cause nonuniform application of the slurry upon application thereof to the support body, failing to provide a uniform ceramic green sheet. The lower limit of the hydroxy group content is preferably 25 mol % and the upper limit thereof is preferably 35 mol %.

In the polyvinyl butyral unit, the amount of the vinyl butyral unit (butyralization degree) is 60 mol % at the minimum and 80 mol % at the maximum. If the amount of the vinyl butyral unit is less than 60 mol %, the resulting ceramic green sheet cannot have sufficient flexibility. Moreover, such a polymer converted into slurry increases the viscosity to cause nonuniform application of the slurry upon application thereof to a support body, failing to provide a uniform ceramic green sheet. If the amount of the vinyl butyral unit is more than 80 mol %, the resulting sheet has poor strength. The lower limit of the amount of the vinyl butyral unit is preferably 65 mol % and the upper limit thereof is preferably 75 mol %.

The amount of the vinyl acetate unit (acetyl group content) of the polyvinyl butyral unit is not particularly limited, and is preferably 30 mol % or less in consideration of the sheet strength in a case where such a polymer is used as a raw material of a ceramic green sheet. If the amount of the vinyl acetate unit is more than 30 mol %, the glass transition temperature of the polyvinyl butyral unit is lowered and the flexibility of the resulting green sheet becomes too high. Such a green sheet has poor handleability, and the balance between the sheet strength and flexibility is lost.

The amount of the polyvinyl butyral unit in the graft copolymer is not particularly limited as it is designed in accordance with the use thereof. The amount is preferably 10 to 90% by weight based on the total amount of the graft copolymer. If the amount of the polyvinyl butyral unit is less than 10% by weight, the resulting ceramic green sheet may have poor sheet strength and fail to have sufficient flexibility. If the amount is more than 90% by weight, the decomposability during firing is lowered to increase residual carbides in the ceramic, possibly lowering the electrical characteristics of the resulting ceramic capacitor.

More preferably, the lower limit is 20% by weight and the upper limit is 90% by weight. Still more preferably, the lower limit is 30% by weight and the upper limit is 80% by weight.

The unit including a poly(meth)acrylic compound (hereafter, also referred to as a poly(meth)acrylic compound unit) is obtainable by polymerization of a (meth)acrylic compound, which is a monomer.

In the present invention, a "(meth)acrylic compound" refers to at least one selected from the group consisting of (meth)acrylic acid esters and (meth)acrylic acids.

The (meth)acrylic acid ester, one of the (meth)acrylic compound, is not particularly limited as long as the resulting poly(meth)acrylic compound unit has a glass transition temperature of 0 to 110° C. Preferably, the (meth)acrylic acid ester contains at least one selected from the group consisting of monofunctional (meth)acrylic acid alkyl esters, monofunctional cyclic (meth)acrylic acid alkyl esters, and monofunctional (meth)acrylic acid aryl esters.

The (meth)acrylic compound contains 90% by weight or more of a methacrylic compound, and preferably contains 90% by weight or more of a monofunctional methacrylic acid ester. With this structure, when a graft copolymer having a unit including such a (meth)acrylic compound is used for a binder for a ceramic green sheet, the resulting binder has higher decomposability upon firing to leave less residual carbides. Moreover, slurry prepared from such a polymer may have an appropriate viscosity.

Examples of the monofunctional (meth)acrylic acid alkyl esters include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, lauryl (meth)acrylate, stearyl (meth)acrylate, isotetradecyl (meth)acrylate, and 2-isocyanatoethyl methacrylate. Among these, methyl (meth)acrylate or isobutyl (meth)acrylate is preferably used as it can set the glass transition temperature of the poly(meth)acrylic compound unit to 0 to 110° C. and has very high decomposability upon firing.

Examples of the monofunctional cyclic (meth)acrylic acid alkyl esters include cyclohexyl (meth)acrylate and isobornyl (meth)acrylate.

Examples of the monofunctional (meth)acrylic acid aryl esters include phenyl (meth)acrylate and benzyl (meth)acrylate.

The (meth)acrylic acid as used herein collectively refers to acrylic acid and methacrylic acid and the (meth)acrylate collectively refers to acrylate and methacrylate.

The (meth)acrylic compound may be used solely or two or more (meth)acrylic compounds may be used in combination as long as the glass transition temperature of the poly(meth)acrylic compound unit is set to 0 to 110° C.

As an exemplary method for setting the glass transition temperature of the poly(meth)acrylic compound unit to 0 to 110° C., the (meth)acrylic compound may be selected in such a manner as to satisfy the following inequality:

$$0 \leq (W1/Tg1) + (W2/Tg2) + \ldots \leq 0.009$$

wherein W1, W2 . . . refer to mass fractions of (meth)acrylic compound 1, (meth)acrylic compound 2, . . . included in the poly(meth)acrylic compound unit;
W1+W2+ . . . =1 is satisfied; and
Tg1, Tg2 . . . refer to glass transition temperatures (° K) of homopolymers of (meth)acrylic compound 1, (meth)acrylic compound 2, . . . included in the poly(meth)acrylic compound unit.

The (meth)acrylic acid ester may contain a (meth)acrylic compound having at least eight carbons in the side chain in an amount of 3 to 30% by weight for the purpose of lowering the glass transition temperature. This structure not only lowers the glass transition temperature of a poly(meth)acrylic compound unit part but also provides a binder excellent in decomposability upon firing when a graft copolymer having a unit including such a (meth)acrylic acid ester is used for a binder for a ceramic green sheet.

Examples of the (meth)acrylic acid ester having at least eight carbons in the side chain include n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, lauryl (meth)acrylate, stearyl (meth)acrylate, and isotetradecyl (meth)acrylate.

The (meth)acrylic compound may contain 3 to 50% by weight of a (meth)acrylic compound having, in a molecule, at least one polar group selected from the group consisting of a carboxyl group, a hydroxy group, an amide group, an amino group, an epoxy group, and an ether group. The (meth)acrylic compound containing such a (meth)acrylic compound having a polar group enables preparation of a binder excellent in dispersibility of inorganic fine particles.

Specific examples thereof include (meth)acrylic acid, 2-hydroxyethyl (meth)acrylate, 3-hydroxypropyl (meth)acrylate, 4-hydroxybutyl (meth)acrylate, (meth)acrylamide, aminoethyl (meth)acrylate, dimethylaminoethyl (meth)acrylate, diethylaminoethyl (meth)acrylate, glycidyl (meth)acrylate, and (meth)acrylic acid ester having a polyethylene glycol chain in an ester side chain such as methoxytriethylene glycol methacrylate.

In particular, containing a (meth)acrylic compound having a carboxyl group or hydroxy group in a molecule can increase the intramolecular and intermolecular interactions in the graft copolymer. In such a case, when a binder containing the resulting graft copolymer is used for manufacturing a ceramic green sheet, the resulting sheet has high sheet strength.

Moreover, containing a (meth)acrylic compound having a carboxyl group, hydroxy group, epoxy group, or ether group in a molecule increases the oxygen content of the binder, and such a binder shows an excellently low residual carbon ratio.

The (meth)acrylic compound included in the poly(meth)acrylic compound contains a (meth)acrylic compound having a carboxyl group, hydroxy group, epoxy group, or ether group in a molecule in an amount of preferably 3% by weight or more, and more preferably 5% by weight or more.

The glass transition temperature of the poly(meth)acrylic compound unit is 0° C. at the minimum and 110° C. at the maximum.

With the glass transition temperature within the above range, when a graft copolymer having such a unit is used for a binder for a ceramic green sheet, a ceramic green sheet having sufficient mechanical strength and flexibility can be obtained.

If the poly(meth)acrylic compound unit has a glass transition temperature of lower than 0° C., when a graft copolymer having such a unit is used for a binder for a ceramic green sheet, the resulting green sheet has very high flexibility, failing to have enough sheet strength. Moreover, the green sheet is stretched/shrunk upon processing, which possibly interferes with the dimensional accuracy. Moreover, since the difference in the glass transition temperature between the poly(meth)acrylic compound unit and the polyvinyl acetal unit increases too much, physical properties cannot be uniform.

In contrast, if the poly(meth)acrylic compound unit has a glass transition temperature of higher than 110° C., an obtainable ceramic green sheet has lower plasticity, resulting in poor adhesiveness upon heat-pressing and poor processability throughout the entire process.

The glass transition temperature of the poly(meth)acrylic compound unit is preferably 20° C. at the minimum and preferably 105° C. at the maximum.

The glass transition temperature of the poly(meth)acrylic compound unit can be measured by excluding the glass transition temperature derived from the polyvinyl butyral unit, which is estimated from the glass transition temperature of the homopolymer, upon differential scanning calorimetry of the graft copolymer.

In a case where a later-described plasticizer is added, the polyvinyl butyral unit is preferentially plasticized, so that the glass transition temperature of the polyvinyl butyral unit is changed. Accordingly, the "glass transition temperature derived from the polyvinyl butyral unit, which is estimated from the glass transition temperature of the homopolymer" needs to be estimated from a homopolymer system to which a plasticizer in the same amount is added.

The binder for manufacturing an inorganic sintered body of the present invention preferably has an average glass transition temperature determined based on the following equation (1) of 20 to 80° C. The average glass transition temperature is more preferably 25 to 75° C.

With the average glass transition temperature within the above range, when such a binder is used as a binder for a ceramic green sheet, the resulting ceramic green sheet has both excellent flexibility and excellent sheet strength.

$$\text{Average glass transition temperature} = \{(\text{Glass transition temperature of unit including polyvinyl butyral}) \times (\text{Amount of unit including polyvinyl butyral in graft copolymer})\} + \{(\text{Glass transition temperature of unit including a poly(meth)acrylic compound}) \times (\text{Amount of unit including a poly(meth)acrylic compound in graft copolymer})\} \quad (1)$$

If the average glass transition temperature is lower than 20° C., when such a binder is used as a binder for a ceramic green sheet, the resulting ceramic green sheet has very high flexibility, failing to have enough sheet strength. Moreover, the green sheet is stretched/shrunk upon processing, which possibly interferes with the dimensional accuracy. In addition, a possibility of stretching/shrinkage of the green sheet due to environmental temperatures around the sheet increases, so that the size stability may be poor.

In contrast, if the average glass transition temperature is higher than 80° C., when such a binder is used as a binder for a ceramic green sheet, an obtainable ceramic green sheet has lower plasticity, resulting not only in lowered flexibility but also in poor adhesiveness upon heat-pressing and poor processability throughout the entire process.

The amount of the poly(meth)acrylic compound unit in the graft copolymer is determined in accordance with the use of the binder and is not particularly limited. The amount is preferably 10 to 90% by weight based on the amount of the graft copolymer. If the amount of the poly(meth)acrylic compound unit is less than 10% by weight, decomposability upon firing is lowered to increase residual carbides contained in the ceramic. In such a case, the resulting ceramic capacitor may have lower electric characteristics. In contrast, if the amount is more than 90% by weight, an obtainable ceramic green sheet may have lowered sheet strength or drastic decomposition occurs upon firing to provide a defective inorganic sintered body sheet having fissures or cracks generated along with volume shrinkage. In such a case, the electric characteristics of the resulting ceramic capacitor may be lowered. The lower limit of the amount is preferably 15% by weight and the upper limit thereof is preferably 80% by weight. The lower limit of the amount is more preferably 20% by weight and the upper limit thereof is more preferably 70% by weight.

The graft ratio (ratio of the unit including a poly(meth)acrylic compound to the unit including polyvinyl butyral in the graft copolymer) of the graft copolymer is determined in accordance with the use of the binder and is not particularly limited. The graft ratio is preferably 10 to 900% by weight. With the graft ratio within the above range, when the graft copolymer is used for a binder for a ceramic green sheet, all of the adhesiveness upon heat-pressing, thermal decomposability of the binder upon firing, sheet strength, and flexibility are achieved.

In the present invention, the term "graft ratio" refers to a ratio of the unit including a poly(meth)acrylic compound to the unit including polyvinyl butyral in the graft copolymer, and is evaluated by the following method. The obtained resin solution is dried at 110° C. for one hour and then dissolved in xylene. An insoluble matter and a soluble matter thereof were separated. Here, the insoluble matter is a graft copolymer. The weights of the unit including polyvinyl butyral and the unit including poly(meth)acrylic compound of the resulting graft copolymer are obtained by NMR. Based on the result, the graft ratio is calculated using the following equation (2):

$$\text{Graft ratio (\%)} = \{(\text{Weight of unit including poly(meth)acrylic compound})/(\text{Weight of unit including polyvinyl butyral})\} \times 100 \quad (2).$$

The graft copolymer may further have a unit including another monomer.

Having a unit including another monomer increases the intermolecular interactions in the resulting graft copolymer. The use of the graft copolymer for a binder enables formation of a ceramic green sheet having high sheet strength. Moreover, in a case where the other monomer has a polar group, the polar group interacts, for example, forms a hydrogen bond, with the surface of inorganic powder to increase the dispersibility of the inorganic powder in the resulting slurry. As a result, even in a case where no dispersant is used, a uniform ceramic green sheet can be formed. Moreover, in a case where the other monomer has a functional group selected from the group consisting of a hydroxy group, a carboxyl group, an epoxy group, and an ether group, the oxygen content of the binder increases to generate a radical that is effective for thermal decomposition. This assists firing of the binder, so that a green sheet to be obtained contains few residual carbides.

The other monomer is not particularly limited and is preferably a monomer having at least one polar group selected from the group consisting of a carboxyl group, a hydroxy group, an amide group, an amino group, an epoxy group, and an ether group and one olefinic double bond in a molecule. Examples of such a monomer include crotonic acid, maleic acid, fumaric acid, citraconic acid, mesaconic acid, itaconic acid, allyl alcohol, vinyl ether, and allylamine. Among these, more preferred are a monomer having a carboxyl group in a molecule and a monomer having a hydroxy group in a molecule because, when a binder containing the resulting graft copolymer is used for manufacturing a ceramic green sheet, the sheet strength thereof is further enhanced.

The amount of the unit including another monomer in the graft copolymer is determined in accordance with the use of the binder and is not particularly limited. The amount is preferably 20% by weight or less, more preferably 10% by weight or less, and still more preferably 5% by weight or less based on the total amount of the graft copolymer.

The method of manufacturing the graft copolymer is not particularly limited, and an exemplary method includes the step of radically polymerizing a mixed monomer containing the (meth)acrylic compound in the presence of a polymerization initiator in an environment where polyvinyl butyral is present.

The polymerization method is not particularly limited, and a conventionally known method may be employed such as solution polymerization, emulsion polymerization, suspension polymerization, or bulk polymerization.

A solvent used in the solution polymerization is not particularly limited, and examples thereof include ethyl acetate, toluene, dimethyl sulfoxide, ethanol, acetone, diethyl ether, tetrahydrofuran, and a mixed solvent of these.

An exemplary specific operation method for manufacturing the graft copolymer is a solution polymerization method that includes the step of placing polyvinyl butyral resin and a solvent in a polymerization vessel equipped with a temperature controller and a stirrer, dissolving the polyvinyl butyral by heating and stirring, adding a monomer containing the (meth)acrylic compound, substituting the air inside the polymerization vessel with nitrogen, and adding a radical polymerization initiator, thereby polymerizing the (meth)acrylic compound.

Another exemplary method is a suspension polymerization method that includes the steps of placing polyvinyl butyral resin, a monomer containing a (meth)acrylic compound, pure water, a dispersant, and a radical polymerization initiator in a polymerization vessel equipped with a temperature controller and a stirrer; substituting the air inside the polymerization vessel with nitrogen; swelling the monomer in the polyvinyl butyral resin; and heating the swelled monomer, thereby polymerizing the (meth)acrylic compound.

A still another exemplary method is a bulk polymerization method that includes the steps of placing polyvinyl butyral resin and a monomer containing a (meth)acrylic compound in a polymerization vessel equipped with a temperature controller and a stirrer, dissolving the polyvinyl butyral in the monomer by stirring the contents over heat, substituting the air inside the polymerization vessel with nitrogen, and adding a radical polymerization initiator, thereby polymerizing the (meth)acrylic compound.

The graft efficiency of the unit including a poly(meth)acrylic compound upon preparation of the graft copolymer is preferably 10% or more, and more preferably 20% or more.

If the graft efficiency is less than 10%, the resulting resin is not uniform, unfavorably lowering the strength and flexibility of the resulting ceramic green sheet.

In the present invention, the term "graft efficiency" refers to a ratio of the (meth)acrylic compound incorporated in the graft copolymer to the entire amount of the added (meth)acrylic compound, and is evaluated by the following method for example.

The obtained resin solution is dried at 110° C. for one hour and then dissolved in xylene. An insoluble matter and a soluble matter thereof are separated. Here, the soluble matter is a homopolymer of a (meth)acrylic compound and the insoluble matter is a graft copolymer.

The weight of the unit including a poly(meth)acrylic compound of the resulting graft copolymer is obtained by NMR. Based on the result, the graft efficiency is calculated using the following equation (3):

Graft efficiency (%)=[(Weight of unit including (meth)acrylic compound in graft copolymer)/{(Weight of (meth)acrylic compound homopolymer)+(Weight of unit including (meth)acrylic compound in graft copolymer)}]×100   (3).

The radical initiator is not particularly limited, and examples thereof include: organic peroxides such as 1,1-di(t-hexyl peroxy)-3,3,5-trimethyl cyclohexane, t-hexyl peroxy neodecanoate, t-butyl peroxy neodecanoate, t-butyl peroxy neoheptanoate, t-hexyl peroxy pivalate, t-butyl peroxy pivalate, di(3,5,5,-trimethyl hexanoyl) peroxide, dilauroyl peroxide, 1,1,3,3-tetramethyl butyl peroxy-2-ethylhexanoate, 2,5-dimethyl-2,5-di(2-ethyl hexanoyl peroxy)hexane, t-hexyl peroxy-2-ethylhexanoate, di(4-methyl benzoyl) peroxide, t-butyl peroxy-2-ethylhexanoate, dibenzoyl peroxide, 1,1-di(t-hexyl peroxy)cyclohexane, t-butyl peroxy isobutyrate, t-butyl peroxy-3,5,5-trimethyl hexanoate, t-butyl peroxy laurate, t-butyl peroxy isopropyl monocarbonate, t-hexyl peroxy benzoate, and t-butyl peroxy acetate; and azo compounds such as 2,2'-azobisisobutyronitrile, 2,2'-azobis(2,4-dimethyl valeronitrile), 4,4'-azobis(4-cyanopentanoic acid), 2,2'-azobis(2-methylbutyronitrile), and azobiscyclohexanecarbonitrile.

Each of these radical initiators may be used alone, or two or more of these may be used in combination.

The binder for manufacturing an inorganic sintered body of the present invention may contain conventionally known additives such as thickeners, plasticizers, lubricants, and antistatic agents to the extent that the effect of the invention is not impaired.

The plasticizers are not particularly limited, and examples thereof include: phthalic acid diesters such as dioctyl phthalate (DOP) and dibutyl phthalate (DBP); adipic acid diesters such as dioctyl adipate; and alkylene glycol diesters such as 2-ethylhexyl triethylene glycol. In particular, preferred are DOP and 2-ethylhexyl triethylene glycol because they are less volatile so that an obtainable sheet can maintain its flexibility.

The binder for manufacturing an inorganic sintered body of the present invention is blended with an organic solvent, inorganic fine particles, and the like to give a paste for manufacturing an inorganic sintered body. The present invention also encompasses such a paste for manufacturing an inorganic sintered body. The present invention further encompasses a ceramic green sheet manufactured using the paste for manufacturing an inorganic sintered body of the present invention.

The organic solvent is not particularly limited, and examples thereof include ethyl acetate, toluene, dimethyl sulfoxide, methanol, ethanol, isopropyl alcohol, butanol, acetone, diethyl ether, tetrahydrofuran, and mixed solvents of these. In particular, the use of alcohol even in a small amount lowers the viscosity of the binder to provide a paste excellent in handleability.

Containing an organic solvent having a boiling point of 80° C. or higher prevents rapid drying, enabling manufacturing of a green sheet with a smooth surface.

The use of the binder for manufacturing an inorganic sintered body of the present invention as a binder for forming a ceramic green sheet enables manufacturing of a ceramic green sheet.

The method for manufacturing a ceramic green sheet is not particularly limited, and a known method may be employed. In an exemplary method, the binder for manufacturing an inorganic sintered body of the present invention is optionally blended with additives such as dispersants and defoamers, and mixed with an organic solvent and ceramic powder uniformly using a mixer such as a ball mill to give slurry. The slurry is applied to a support body such as a PET film by a wet process by a known method such as a doctor blade method. Then, the organic solvent is removed by drying. In another method, the slurry is granulated by a spray dryer method, and then molded by a dry pressing method.

Thus obtained ceramic green sheet is optionally subjected to various processing such as punching and then used for manufacturing of various ceramic products. For example, in manufacturing of a layered ceramic capacitor, a support body to be used is a PET film preliminary subjected to mold-release treatment. After application of an electrically conductive paste that will serve as an internal electrode on a ceramic green sheet by screen printing or the like, the ceramic green sheet is peeled from the PET film as a support body and punched to give a piece in a predetermined size. A plurality of such pieces are laminated and heat-pressed to give a ceramic laminate, and the binder resin is thermally decomposed to be removed through firing.

The present invention also encompasses a ceramic laminate obtainable by laminating and heat-pressing a plurality of the ceramic green sheets.

In this case, the binder for manufacturing an inorganic sintered body included in the ceramic green sheet preferably has an average glass transition temperature that is lower than the heat-pressing temperature by 10° C. or more. In such a case, adhesiveness upon heat-pressing is especially favorable. The heat-pressing temperature is preferably 50 to 100° C. With the heat-pressing temperature within such a range, the ceramic green sheets can be sufficiently bonded to each other while stably maintaining the size thereof.

Advantageous Effects of Invention

The present invention provides a binder for manufacturing an inorganic sintered body that is excellent in adhesiveness upon heat pressing and thermal decomposability and, when used as a binder for a ceramic green sheet, provides a ceramic green sheet having sufficient mechanical strength and flexibility. The present invention also provides a paste for manufacturing an inorganic sintered body, a ceramic green sheet, and a ceramic laminate individually manufactured using the binder for manufacturing an inorganic sintered body.

DESCRIPTION OF EMBODIMENTS

Embodiments of the present invention are specifically described with reference to examples, but are not limited only to these examples.

Example 1

(1) Preparation of Graft Copolymer

A reaction vessel equipped with a thermometer, a stirrer, a nitrogen inlet tube, and a condenser tube was charged with 25 parts by weight of polyvinyl butyral (polymerization degree of 1700, butyralization degree of 68.0 mol %, hydroxy group content of 30.8 mol %, acetyl group content of 1.2 mol %), 25 parts by weight of isobutyl methacrylate, and 100 parts by weight of ethyl acetate. The contents were stirred so that polyvinyl butyral was dissolved. Next, nitrogen gas was blown into the reaction vessel for 30 minutes so that the air inside was substituted with nitrogen, and the contents in the reaction vessel were heated to 75° C. with stirring. After 30 minutes, a polymerization initiator solution prepared by diluting 0.5 parts by weight of t-hexyl peroxy pivalate as a polymerization initiator with 16 parts by weight of ethyl acetate was added dropwise to the reaction vessel over 5 hours. Then, the reaction was allowed to proceed at 75° C. for 3 hours.

Next, the reaction liquid was cooled to give a graft copolymer solution (solid content of 30% by weight) containing a graft copolymer. An amount of 10 parts by weight of the solution was blended with 0.3 parts by weight of dioctyl phthalate as a plasticizer.

The weight average molecular weight in terms of polystyrene of the obtained graft copolymer was measured by the GPC method using a "2690 Separations Model" (available from Waters) as a column, and was 250000.

The graft efficiency was 63% and the graft ratio was 61%.

A glass transition temperature of a poly(meth)acrylic compound unit of the obtained graft copolymer was 48° C. and an average glass transition temperature was 45.5° C.

(2) Manufacturing of Ceramic Green Sheet

The resulting graft copolymer solution was diluted with a diluting solvent (mixed solvent of ethanol and toluene, weight ratio (ethanol:toluene) of 1:1) to give a solution having a solid content of 10% by weight. Next, 20 parts by weight of the solution was blended with 20 parts by weight of barium titanate powder (BT-03, average particle size of 0.3 μm, available from SAKAI CHEMICAL INDUSTRY CO., LTD.) as ceramic powder, and mixed using a ball mill for 48 hours to give slurry for a ceramic green sheet.

The obtained slurry for a ceramic green sheet was applied to a PET film preliminary subjected to mold release treatment, using a coater in such a manner that the thickness after drying becomes 3 μm. The applied slurry was air-dried at ambient temperature for one hour, and dried at 80° C. for one hour and then at 120° C. for one hour by a hot air dryer, thereby providing a ceramic green sheet.

Example 2

A graft copolymer solution (solid content of 30% by weight) containing a graft copolymer was prepared in the same manner as in Example 1, except that, in "(1) Preparation of graft copolymer" of Example 1, 25 parts by weight of isobutyl methacrylate was replaced with 20 parts by weight of isobutyl methacrylate and 5 parts by weight of 2-ethylhexyl methacrylate. Then, 10 parts by weight of the solution was blended with 0.3 parts by weight of dioctyl phthalate as a plasticizer.

The weight average molecular weight in terms of polystyrene of the obtained graft copolymer was measured by the GPC method using a "2690 Separations Model" (available from Waters) as a column, and was 270000.

A glass transition temperature of a poly(meth)acrylic compound unit of the obtained graft copolymer was 34° C. and an average glass transition temperature was 39° C.

A ceramic green sheet was prepared in the same manner as in "(2) Preparation of ceramic green sheet" in Example 1, except that the obtained graft copolymer solution was used.

Example 3

A graft copolymer solution (solid content of 30% by weight) containing a graft copolymer was prepared in the same manner as in Example 1, except that, in "(1) Preparation of graft copolymer" of Example 1, polyvinyl butyral (polymerization degree of 800, butyralization degree of 67.0 mol %, hydroxy group content of 32.0 mol %, acetyl group content of 1.0 mol %) was used. Then, 10 parts by weight of the solution was blended with 0.3 parts by weight of dioctyl phthalate as a plasticizer.

The weight average molecular weight in terms of polystyrene of the obtained graft copolymer was measured by the GPC method using a "2690 Separations Model" (available from Waters) as a column, and was 240000.

A glass transition temperature of a poly(meth)acrylic compound unit of the obtained graft copolymer was 49° C. and an average glass transition temperature was 44.5° C.

A ceramic green sheet was prepared in the same manner as in "(2) Preparation of ceramic green sheet" in Example 1, except that the obtained graft copolymer solution was used.

Example 4

A graft copolymer solution (solid content of 30% by weight) containing a graft copolymer was prepared in the same manner as in Example 1, except that, in "(1) Preparation of graft copolymer" of Example 1, polyvinyl butyral (polymerization degree of 3500, butyralization degree of 67.9 mol %, hydroxy group content of 30.7 mol %, acetyl group content of 1.4 mol %) was used. Then, 10 parts by weight of the solution was blended with 0.3 parts by weight of dioctyl phthalate as a plasticizer.

The weight average molecular weight in terms of polystyrene of the obtained graft copolymer was measured by the GPC method using a "2690 Separations Model" (available from Waters) as a column, and was 430000.

A glass transition temperature of a poly(meth)acrylic compound unit of the obtained graft copolymer was 51° C. and an average glass transition temperature was 48.5° C.

A ceramic green sheet was prepared in the same manner as in "(2) Preparation of ceramic green sheet" in Example 1, except that the obtained graft copolymer solution was used.

Example 5

A graft copolymer solution (solid content of 40% by weight) containing a graft copolymer was prepared in the same manner as in Example 1, except that, in "(1) Preparation of graft copolymer" of Example 1, 25 parts by weight of isobutyl methacrylate was replaced with 25 parts by weight of isobutyl methacrylate and 12 parts by weight of glycidyl methacrylate. Then, 10 parts by weight of the solution was blended with 0.3 parts by weight of dibutyl phthalate as a plasticizer.

The weight average molecular weight in terms of polystyrene of the obtained graft copolymer was measured by the GPC method using a "2690 Separations Model" (available from Waters) as a column, and was 350000.

A glass transition temperature of a poly(meth)acrylic compound unit of the obtained graft copolymer was 47° C. and an average glass transition temperature was 45° C.

A ceramic green sheet was prepared in the same manner as in "(2) Preparation of ceramic green sheet" in Example 1, except that the obtained graft copolymer solution was used.

Example 6

A graft copolymer solution (solid content of 30% by weight) containing a graft copolymer was prepared in the same manner as in Example 1, except that, in "(1) Preparation of graft copolymer" of Example 1, polyvinyl butyral (polymerization degree of 3500, butyralization degree of 67.9 mol %, hydroxy group content of 30.7 mol %, acetyl group content of 1.4 mol %) was used, and 25 parts by weight of isobutyl methacrylate was replaced with 25 parts by weight of methyl methacrylate. Then, 10 parts by weight of the solution was blended with 0.6 parts by weight of dibutyl phthalate as a plasticizer.

The weight average molecular weight in terms of polystyrene of the obtained graft copolymer was measured by the GPC method using a "2690 Separations Model" (available from Waters) as a column, and was 430000.

A glass transition temperature of a poly(meth)acrylic compound unit of the obtained graft copolymer was 107° C. and an average glass transition temperature was 65° C.

A ceramic green sheet was prepared in the same manner as in "(2) Preparation of ceramic green sheet" in Example 1, except that the obtained graft copolymer solution was used.

Example 7

A graft copolymer solution (solid content of 50% by weight) containing a graft copolymer was prepared in the same manner as in Example 1, except that, in "(1) Preparation of graft copolymer" of Example 1, polyvinyl butyral (polymerization degree of 800, butyralization degree of 65.1 mol %, hydroxy group content of 33.9 mol %, acetyl group content of 1.0 mol %) was used, and 25 parts by weight of isobutyl methacrylate was replaced with 30 parts by weight of methyl methacrylate, 5 parts by weight of 2-hydroxy ethyl methacrylate, and 5 parts by weight of glycidyl methacrylate. Then, 10 parts by weight of the solution was blended with 0.6 parts by weight of dibutyl phthalate as a plasticizer.

The weight average molecular weight in terms of polystyrene of the obtained graft copolymer was measured by the GPC method using a "2690 Separations Model" (available from Waters) as a column, and was 230000.

A glass transition temperature of a poly(meth)acrylic compound unit of the obtained graft copolymer was 89° C. and an average glass transition temperature was 62.8° C.

A ceramic green sheet was prepared in the same manner as in "(2) Preparation of ceramic green sheet" in Example 1, except that the obtained graft copolymer solution was used.

Example 8

A graft copolymer solution (solid content of 50% by weight) containing a graft copolymer was prepared in the same manner as in Example 1, except that, in "(1) Preparation of graft copolymer" of Example 1, polyvinyl butyral (polymerization degree of 3800, butyralization degree of 66.9 mol %, hydroxy group content of 31.2 mol %, acetyl group content of 1.9 mol %) was used, and 25 parts by weight of isobutyl methacrylate was replaced with 20 parts by weight of methyl methacrylate and 5 parts by weight of glycidyl methacrylate. Then, 10 parts by weight of the solution was blended with 0.6 parts by weight of dibutyl phthalate as a plasticizer.

The weight average molecular weight in terms of polystyrene of the obtained graft copolymer was measured by the GPC method using a "2690 Separations Model" (available from Waters) as a column, and was 450000.

A glass transition temperature of a poly(meth)acrylic compound unit of the obtained graft copolymer was 91° C. and an average glass transition temperature was 58° C.

A ceramic green sheet was prepared in the same manner as in "(2) Preparation of ceramic green sheet" in Example 1, except that the obtained graft copolymer solution was used.

Example 9

A graft copolymer solution (solid content of 50% by weight) containing a graft copolymer was prepared in the same manner as in Example 1, except that, in "(1) Preparation of graft copolymer" of Example 1, polyvinyl butyral (polymerization degree of 1700, butyralization degree of 68.1 mol %, hydroxy group content of 31.0 mol %, acetyl group content of 0.9 mol %) was used, and 25 parts by weight of isobutyl methacrylate was replaced with 3 parts by weight of isobutyl methacrylate, 1 part by weight of 2-hydroxy ethyl methacrylate, and 1 part by weight of glycidyl methacrylate. Then, 10 parts by weight of the solution was blended with 0.6 parts by weight of dibutyl phthalate as a plasticizer.

The weight average molecular weight in terms of polystyrene of the obtained graft copolymer was measured by the GPC method using a "2690 Separations Model" (available from Waters) as a column, and was 300000.

A glass transition temperature of a poly(meth)acrylic compound unit of the obtained graft copolymer was 47° C. and an average glass transition temperature was 29.5° C.

A ceramic green sheet was prepared in the same manner as in "(2) Preparation of ceramic green sheet" in Example 1, except that the obtained graft copolymer solution was used.

Example 10

A graft copolymer solution (solid content of 50% by weight) containing a graft copolymer was prepared in the same manner as in Example 1, except that, in "(1) Preparation of graft copolymer" of Example 1, polyvinyl butyral (polymerization degree of 4000, butyralization degree of 65.9 mol %, hydroxy group content of 32.2 mol %, acetyl group content of 1.9 mol %) was used, and 25 parts by weight of isobutyl methacrylate was replaced with 14 parts by weight of methyl methacrylate and 1 part by weight of 2-hydroxy ethyl methacrylate.

The weight average molecular weight in terms of polystyrene of the obtained graft copolymer was measured by the GPC method using a "2690 Separations Model" (available from Waters) as a column, and was 300000. Then, 10 parts by weight of the solution was blended with 0.3 parts by weight of dibutyl phthalate as a plasticizer.

A glass transition temperature of a poly(meth)acrylic compound unit of the obtained graft copolymer was 101° C. and an average glass transition temperature was 64.8° C.

A ceramic green sheet was prepared in the same manner as in "(2) Preparation of ceramic green sheet" in Example 1, except that the obtained graft copolymer solution was used.

Comparative Example 1

A polyvinyl butyral resin solution was prepared by dissolving 50 parts by weight of polyvinyl butyral (polymerization degree of 800, butyralization degree of 68.0 mol %, hydroxy group content of 30.8 mol %, acetyl group content of 1.2 mol %) in a mixed solvent of ethanol and toluene (ethanol:toluene=1:1) to a solid content of 10% by weight. Then, 10 parts by weight of the solution was blended with 0.1 parts by weight of dibutyl phthalate as a plasticizer.

The weight average molecular weight in terms of polystyrene of the obtained polyvinyl butyral was measured by the GPC method using a "2690 Separations Model" (available from Waters) as a column, and was 150000.

A ceramic green sheet was prepared in the same manner as in "(2) Preparation of ceramic green sheet" in Example 1, except that the graft copolymer solution was replaced with the obtained polyvinyl butyral resin solution.

Comparative Example 2

A polyisobutyl methacrylate solution was prepared by dissolving 50 parts by weight of polyisobutyl methacrylate (weight average molecular weight of 80000) in a mixed solvent of ethanol and toluene (ethanol:toluene=1:1) to a solid content of 10% by weight. Then, 10 parts by weight of the solution was blended with 0.1 parts by weight of dioctyl phthalate as a plasticizer.

A ceramic green sheet was prepared in the same manner as in "(2) Preparation of ceramic green sheet" in Example 1, except that the graft copolymer solution was replaced with the obtained polyisobutyl methacrylate solution.

The polyisobutyl methacrylate had a glass transition temperature of 52° C.

Comparative Example 3

A mixed resin solution was prepared by dissolving a mixture (1:1 in weight ratio) of 25 parts by weight of polyvinyl butyral (polymerization degree of 800, butyralization degree of 68.0 mol %, hydroxy group content of 30.8 mol %, acetyl group content of 1.2 mol %) and 25 parts by weight of polyisobutyl methacrylate (weight average molecular weight of 80,000) in a mixed solvent of ethanol and toluene (ethanol:toluene=1:1) to a solid content of 10% by weight. Moreover, 10 parts by weight of the solution was blended with 0.1 parts by weight of dibutyl phthalate as a plasticizer.

A ceramic green sheet was prepared in the same manner as in "(2) Preparation of ceramic green sheet" in Example 1, except that the graft copolymer solution was replaced with the obtained mixed resin solution.

Comparative Example 4

A reaction vessel equipped with a thermometer, a stirrer, a nitrogen inlet tube, and a condenser tube was charged with 25 parts by weight of polyvinyl butyral (polymerization degree of 800, butyralization degree of 60.2 mol %, hydroxy group content of 39.0 mol %, acetyl group content of 0.8 mol %) terminated with a mercapto group, 100 parts by weight of isobutyl methacrylate, and 100 parts by weight of ethyl acetate. The contents were stirred so that polyvinyl butyral was dissolved. Then, 10 parts by weight of the solution was blended with 0.1 parts by weight of dioctyl phthalate as a plasticizer.

Next, nitrogen gas was blown into the reaction vessel for 30 minutes so that the air inside was substituted with nitrogen, and the contents in the reaction vessel were heated to 75° C. with stirring.

After 30 minutes, a polymerization initiator solution prepared by diluting 0.5 parts by weight of AIBN as a polymerization initiator with 16 parts by weight of ethyl acetate was added dropwise to the reaction vessel over 5 hours.

Then, the reaction was allowed to proceed at 75° C. for 3 hours.

Next, the reaction liquid was cooled to give a block copolymer solution (solid content of 20% by weight) containing a block copolymer.

The weight average molecular weight in terms of polystyrene of the obtained block copolymer was measured by the GPC method using a "2690 Separations Model" (available from Waters) as a column, and was 200000.

A ceramic green sheet was prepared in the same manner as in "(2) Preparation of ceramic green sheet" in Example 1, except that the obtained block copolymer solution was used.

Comparative Example 5

A graft copolymer solution (solid content of 30% by weight) containing a graft copolymer was prepared in the same manner as in Example 1, except that, in "(1) Preparation of graft copolymer" of Example 1, 25 parts by weight of isobutyl methacrylate was replaced with 20 parts by weight of methyl methacrylate and 5 parts by weight of isobornyl methacrylate. Moreover, 10 parts by weight of the solution was blended with 0.3 parts by weight of dioctyl phthalate as a plasticizer.

The weight average molecular weight in terms of polystyrene of the obtained graft copolymer was measured by the GPC method using a "2690 Separations Model" (available from Waters) as a column, and was 240000.

A glass transition temperature of a poly(meth)acrylic compound unit of the obtained graft copolymer was 118° C. and an average glass transition temperature was 81° C.

A ceramic green sheet was prepared in the same manner as in "(2) Preparation of ceramic green sheet" in Example 1, except that the obtained graft copolymer solution was used.

Comparative Example 6

A graft copolymer solution (solid content of 30% by weight) containing a graft copolymer was prepared in the same manner as in Example 1, except that, in "(1) Preparation of graft copolymer" of Example 1, polyvinyl butyral (polymerization degree of 800, butyralization degree of 67.0 mol %, hydroxy group content of 32.0 mol %, acetyl group content of 1.0 mol %) was used, and 25 parts by weight of isobutyl methacrylate was replaced with 25 parts by weight of 2-ethylhexyl methacrylate. Then, 10 parts by weight of the solution was blended with 0.3 parts by weight of dioctyl phthalate as a plasticizer.

The weight average molecular weight in terms of polystyrene of the obtained graft copolymer was measured by the GPC method using a "2690 Separations Model" (available from Waters) as a column, and was 200000.

A glass transition temperature of a poly(meth)acrylic compound unit of the obtained graft copolymer was −5° C. and an average glass transition temperature was 19° C.

A ceramic green sheet was prepared in the same manner as in "(2) Preparation of ceramic green sheet" in Example 1, except that the obtained graft copolymer solution was used.
(Evaluation Method)

Properties of the obtained resin solutions and ceramic green sheets were evaluated by the following methods. Table 1 shows the results.

(Glass Transition Temperature of Poly(Meth)Acrylic Compound Unit)

The obtained resin solutions were each dried at 110° C. for one hour and then dissolved in xylene. An insoluble matter and a soluble matter thereof were separated. Here, the soluble matter was determined to be a homopolymer of a (meth)acrylic compound and the insoluble matter was determined to be a graft copolymer thereof.

The obtained graft copolymer was subjected to differential scanning calorimetry using a DSC6200 (available from SII) at a rate of temperature rise of 10° C./min.

Out of two measured glass transition temperatures, the glass transition temperature not derived from a polyvinyl acetal unit estimated from the glass transition temperature of a homopolymer was determined to be the glass transition temperature of a poly(meth)acrylic compound unit.

(Evaluation of Thermal Decomposability)

Films of a binder resin having a thickness of 100 µm were prepared using the obtained resin solutions. The films were heated to 600° C. and observed whether or not they are completely decomposed. The thermal decomposability thereof was evaluated based on the following criteria.

OO (Excellent): Completely decomposed with no residues.
O (Good): Almost completely decomposed with few residues.
x (Poor): Residues were obviously left.

(Evaluation of Strength/Peeling Property)

The obtained ceramic green sheet was peeled from the polyester film, and the condition thereof was visually observed. The strength and peeling property thereof were evaluated based on the following criteria.

OO (Excellent): Ceramic green sheet was finely peeled from polyester film, and the peeled sheet had no cuts or breaks.
O (Good): Ceramic green sheet was finely peeled from polyester film, and the peeled sheet had slight cuts only in a small part.
x (Poor): Ceramic green sheet could not be peeled from polyester film, or the peeled sheet had cuts or breaks over a large part thereof.

(Flexibility)

The central portion of the green sheet was pressed by a glass core rod having a diameter of 2 mm. A 180° bending test was performed in which the green sheet was bended from the pressed central portion. The flexibility of the sheet was evaluated based on the following criteria.

O (Good): No crack was observed.
x (Poor): Cracks were observed.

(Adhesiveness)

The obtained green sheet was cut into a 10 cm-square piece. Ten sheets of the resulting pieces were laminated under thermocompression bonding conditions of a temperature of 70° C. under a pressure of 150 kg/cm² for 10 minutes. The interlayer adhesiveness was visually observed and evaluated based on the following criteria.

OO (Excellent): Layers were firmly bonded to each other with no interlayer peeling.
O (Good): Interlayer peeling was partly observed.
x (Poor): Interlayer peeling was observed in many parts.

(Sheet Uniformity)

The condition of the obtained ceramic green sheet was visually observed, and the sheet uniformity was evaluated based on the following criteria.

OO (Excellent): Uniform ceramic green sheet with no unevenness therein was obtained.
O (Good): Almost uniform ceramic green sheet with almost no unevenness therein was obtained.
x (Poor): Obvious unevenness was found in the ceramic green sheet.

TABLE 1

| | | | | Example | | | | | | | |
|---|---|---|---|---|---|---|---|---|---|---|---|
| | | | | | 1 | 2 | 3 | 4 | 5 | 6 | 7 | 8 |
| Binder resin | Polyvinyl butyral unit | Polyvinyl butyral | Amount (parts by weight) | 25 | 25 | 25 | 25 | 25 | 25 | 25 | 25 |
| | | | Polymerization degree | 1700 | 1700 | 800 | 3500 | 1700 | 3500 | 800 | 3800 |
| | | | Butyralization degree (mol %) | 68.0 | 68.0 | 67.0 | 67.9 | 68.0 | 67.9 | 65.1 | 66.9 |
| | | | Hydroxy group content (mol %) | 30.8 | 30.8 | 32.0 | 30.7 | 30.8 | 30.7 | 33.9 | 31.2 |
| | | | Glass transition temperature (° C.) | 43 | 44 | 40 | 46 | 42 | 23 | 21 | 25 |
| | Poly(meth)acrylic compound unit | Isobutyl methacrylate | Amount (parts by weight) | 25 | 20 | 25 | 25 | 25 | 0 | 0 | 0 |
| | | Methyl methacrylate | Amount (parts by weight) | 0 | 0 | 0 | 0 | 0 | 25 | 30 | 20 |
| | | 2-Ethylhexyl methacrylate | Amount (parts by weight) | 0 | 5 | 0 | 0 | 0 | 0 | 0 | 0 |
| | | 2-Hydroxyethyl methacrylate | Amount (parts by weight) | 0 | 0 | 0 | 0 | 0 | 0 | 5 | 0 |
| | | Glycidyl methacrylate | Amount (parts by weight) | 0 | 0 | 0 | 0 | 12 | 0 | 5 | 5 |
| | | Isobornyl methacrylate | Amount (parts by weight) | 0 | 0 | 0 | 0 | 0 | 0 | 0 | 0 |
| | | | Glass transition temperature (° C.) | 48 | 34 | 49 | 51 | 47 | 107 | 89 | 91 |
| | Average glass transition temperature (° C.) | | | 45.5 | 39 | 44.5 | 48.5 | 45 | 65 | 62.8 | 58 |
| Evaluation of resin solution | | Weight ratio (%) of polyvinyl butyral unit | | 61 | 68 | 55 | 63 | 39 | 58 | 43 | 63 |
| | | Weight ratio (%) of poly(meth)acrylic acid compound unit | | 39 | 32 | 45 | 37 | 61 | 42 | 57 | 37 |
| | | Evaluation of thermal decomposability | | ⊙ | ⊙ | ⊙ | ○ | ⊙ | ⊙ | ⊙ | ⊙ |
| Evaluation of green sheet | | Evaluation of strength/peeling property | | ⊙ | ○ | ○ | ⊙ | ○ | ⊙ | ○ | ⊙ |
| | | Flexibility | | ○ | ○ | ○ | ○ | ○ | ○ | ○ | ○ |
| | | Adhesiveness | | ⊙ | ⊙ | ⊙ | ⊙ | ⊙ | ○ | ⊙ | ⊙ |
| | | Sheet uniformity | | ○ | ○ | ○ | ○ | ○ | ⊙ | ⊙ | ⊙ |

| | | | | Example | | Comparative Example | | | | | |
|---|---|---|---|---|---|---|---|---|---|---|---|
| | | | | 9 | 10 | 1 | 2 | 3*1 | 4*2 | 5 | 6 |
| Binder resin | Polyvinyl butyral unit | Polyvinyl butyral | Amount (parts by weight) | 25 | 25 | 50 | 0 | 25 | 25 | 25 | 25 |
| | | | Polymerization degree | 1700 | 4000 | 800 | — | 800 | 800 | 1700 | 800 |
| | | | Butyralization degree (mol %) | 68.1 | 65.9 | 68.0 | — | 68.0 | 60.2 | 68.0 | 67.0 |
| | | | Hydroxy group content (mol %) | 31.0 | 32.2 | 30.8 | — | 30.8 | 39.0 | 30.8 | 32.0 |
| | | | Glass transition temperature (° C.) | 26 | 43 | 43 | — | 41 | 41 | 44 | 43 |
| | Poly(meth)acrylic compound unit | Isobutyl methacrylate | Amount (parts by weight) | 3 | 0 | 0 | 50 | 25 | 100 | 0 | 0 |
| | | Methyl methacrylate | Amount (parts by weight) | 0 | 14 | 0 | 0 | 0 | 0 | 20 | 0 |
| | | 2-Ethylhexyl methacrylate | Amount (parts by weight) | 0 | 0 | 0 | 0 | 0 | 0 | 0 | 25 |
| | | 2-Hydroxyethyl methacrylate | Amount (parts by weight) | 1 | 1 | 0 | 0 | 0 | 0 | 0 | 0 |
| | | Glycidyl methacrylate | Amount (parts by weight) | 1 | 0 | 0 | 0 | 0 | 0 | 0 | 0 |
| | | Isobornyl methacrylate | Amount (parts by weight) | 0 | 0 | 0 | 0 | 0 | 0 | 5 | 0 |
| | | | Glass transition temperature (° C.) | 47 | 101 | — | 52 | — | — | 118 | −5 |
| | Average glass transition temperature (° C.) | | | 29.5 | 64.8 | — | — | — | — | 81 | 19 |
| Evaluation of resin solution | | Weight ratio (%) of polyvinyl butyral unit | | 88 | 65 | — | — | — | — | 60 | 59 |
| | | Weight ratio (%) of poly(meth)acrylic acid compound unit | | 12 | 35 | — | — | — | — | 40 | 41 |
| | | Evaluation of thermal decomposability | | ○ | ⊙ | X | ⊙ | X | ⊙ | ⊙ | ○ |
| Evaluation of green sheet | | Evaluation of strength/peeling property | | ○ | ⊙ | ⊙ | X | X | ○ | ○ | X |
| | | Flexibility | | ○ | ○ | ○ | X | X | X | ○ | ○ |
| | | Adhesiveness | | ⊙ | ⊙ | ○ | ⊙ | ○ | ○ | X | ○ |
| | | Sheet uniformity | | ⊙ | ⊙ | ○ | ○ | X | ○ | ○ | ○ |

*1 Mixture of resins
*2 Block copolymer

INDUSTRIAL APPLICABILITY

The present invention provides a binder for manufacturing an inorganic sintered body that has excellent adhesiveness upon heat pressing and thermal decomposability and, especially when used as a binder for a ceramic green sheet, provides a ceramic green sheet having sufficient mechanical strength and flexibility. The present invention also provides a paste for manufacturing an inorganic sintered body, a ceramic green sheet, and a ceramic laminate individually manufactured using the binder for manufacturing an inorganic sintered body.

The invention claimed is:

1. A binder for manufacturing an inorganic sintered body containing a graft copolymer, the graft copolymer having a unit including polyvinyl butyral and a unit including a poly(meth)acrylic compound,
the polyvinyl butyral having a polymerization degree of 800 to 5000, a hydroxy group content of 20 to 40 mol %, and a butyralization degree of 60 to 80 mol %,
the unit including a poly(meth)acrylic compound having a glass transition temperature of 0 to 110° C.

2. The binder for manufacturing an inorganic sintered body according to claim 1,
wherein an average glass transition temperature obtained by calculation using Equation (1) is 20 to 80° C.:

Average glass transition temperature={(Glass transition temperature of unit including polyvinyl butyral)×(Amount of unit including polyvinyl butyral in graft copolymer)}+{(Glass transition temperature of unit including poly(meth)acrylic compound)×(Amount of unit including poly(meth)acrylic compound in graft copolymer)}  (1).

3. The binder for manufacturing an inorganic sintered body according to claim 1,
wherein the graft copolymer having a unit including polyvinyl butyral and a unit including a poly(meth)acrylic compound contains 10 to 90% by weight of the unit including polyvinyl butyral and 10 to 90% by weight of the unit including a poly(meth)acrylic compound.

4. The binder for manufacturing an inorganic sintered body according to claim 1,
wherein the poly(meth)acrylic compound includes a (meth)acrylic compound containing 90% by weight or more of a methacrylic compound.

5. The binder for manufacturing an inorganic sintered body according to claim 1,
wherein the poly(meth)acrylic compound includes a (meth)acrylic compound containing 3 to 50% by weight of a (meth)acrylic compound having a carboxyl group, hydroxy group, epoxy group, or ether group in a molecule.

6. A paste for manufacturing an inorganic sintered body comprising:
the binder for manufacturing an inorganic sintered body according to claim 1;
an organic solvent; and
inorganic fine particles.

7. A ceramic green sheet formed using the paste for manufacturing an inorganic sintered body according to claim 6.

8. A ceramic laminate obtained by laminating and heat-pressing a plurality of the ceramic green sheets according to claim 7,
the binder for manufacturing an inorganic sintered body having an average glass transition temperature that is lower than a heat-pressing temperature by at least 10° C.

9. The binder for manufacturing an inorganic sintered body according to claim 2,
wherein the graft copolymer having a unit including polyvinyl butyral and a unit including a poly(meth)acrylic compound contains 10 to 90% by weight of the unit including polyvinyl butyral and 10 to 90% by weight of the unit including a poly(meth)acrylic compound.

10. The binder for manufacturing an inorganic sintered body according to claim 2,
wherein the poly(meth)acrylic compound includes a (meth)acrylic compound containing 90% by weight or more of a methacrylic compound.

11. The binder for manufacturing an inorganic sintered body according to claim 3,
wherein the poly(meth)acrylic compound includes a (meth)acrylic compound containing 90% by weight or more of a methacrylic compound.

12. The binder for manufacturing an inorganic sintered body according to claim 2,
wherein the poly(meth)acrylic compound includes a (meth)acrylic compound containing 3 to 50% by weight of a (meth)acrylic compound having a carboxyl group, hydroxy group, epoxy group, or ether group in a molecule.

13. The binder for manufacturing an inorganic sintered body according to claim 3,
wherein the poly(meth)acrylic compound includes a (meth)acrylic compound containing 3 to 50% by weight of a (meth)acrylic compound having a carboxyl group, hydroxy group, epoxy group, or ether group in a molecule.

14. A paste for manufacturing an inorganic sintered body comprising:
the binder for manufacturing an inorganic sintered body according to claim 2;
an organic solvent; and
inorganic fine particles.

15. A paste for manufacturing an inorganic sintered body comprising:
the binder for manufacturing an inorganic sintered body according to claim 3;
an organic solvent; and
inorganic fine particles.

16. A paste for manufacturing an inorganic sintered body comprising:
the binder for manufacturing an inorganic sintered body according to claim 4;
an organic solvent; and
inorganic fine particles.

17. A paste for manufacturing an inorganic sintered body comprising:
the binder for manufacturing an inorganic sintered body according to claim 5;
an organic solvent; and
inorganic fine particles.

* * * * *